United States Patent

Alexander, IV et al.

(10) Patent No.: US 6,867,275 B2
(45) Date of Patent: Mar. 15, 2005

US006867275B2

(54) SOLID MEDIA

(75) Inventors: James Nelson Alexander, IV, Lansdale, PA (US); James Henry Barrett, Feasterville, PA (US); Richard John Piccolini, Newtown, PA (US); Robert Howard Gore, Southampton, PA (US); Carlos Alfonso Cruz, Holland, PA (US); Biwang Jiang, Horsham, PA (US); Eric Gustave Lundquist, North Wales, PA (US); Warren Harvey Machleder, Blue Bell, PA (US); Newman Mayer Bortnick, Sarasota, FL (US)

(73) Assignee: Rohm and Haas Company, Philadelphia, PA (US)

( * ) Notice: Subject to any disclaimer, the term of this patent is extended or adjusted under 35 U.S.C. 154(b) by 372 days.

(21) Appl. No.: 10/097,258

(22) Filed: Mar. 15, 2002

(65) Prior Publication Data

US 2002/0177522 A1 Nov. 28, 2002

Related U.S. Application Data

(60) Provisional application No. 60/280,663, filed on Mar. 30, 2001.

(51) Int. Cl.$^7$ .............................. C08F 36/20
(52) U.S. Cl. ................ 526/336; 526/328; 526/323.1; 526/319

(58) Field of Search ................ 526/336, 328, 526/323.1, 319

(56) References Cited

U.S. PATENT DOCUMENTS

| 6,074,979 A | | 6/2000 | Hagemeyer et al. | |
|---|---|---|---|---|
| 6,117,454 A | * | 9/2000 | Kreuter et al. | 424/490 |
| 2002/0017274 A1 | | 2/2002 | Wild et al. | 123/350 |

FOREIGN PATENT DOCUMENTS

| WO | WO 93/24534 | * 12/1993 |
|---|---|---|
| WO | WO 96/24377 | 8/1996 |
| WO | WO 99/10527 | 3/1999 |
| WO | WO 00/55165 | 9/2000 |
| WO | WO 01/18242 | 3/2001 |
| WO | WO 02/14377 | * 2/2002 |

* cited by examiner

*Primary Examiner*—Ling-Siu Choi
(74) *Attorney, Agent, or Firm*—Kim R. Jessum; Jeffrey H. Rosedale

(57) ABSTRACT

Solid media useful for a variety of applications, such as separations, catalysis, drug carriers, sensors, and combinatorial chemistry, are disclosed. The solid media are prepared with PNPs having a diameter of 1 to 50 nanometers, the PNPs including as polymerized units a multi-ethylenically-unsaturated monomer. Also provided are methods for preparing the solid media.

5 Claims, No Drawings

SOLID MEDIA

CROSS REFERENCE TO RELATED PATENT APPLICATIONS

This is a non-provisional application of prior pending U.S. provisional application Ser. No. 60/280,663 filed Mar. 30, 2001.

This invention relates to improved solid media. In particular, this invention relates to solid media, such as a separations medium, a catalytic material, a drug carrying material, a sensor material and a combinatorial chemistry medium, including crosslinked polymeric nanoparticles (hereinafter "PNPs"), the solid medium having at least one property improved relative to that of the solid medium absent the PNPs. The PNPs have a mean diameter in the range of from 1 to 50 nm, which impart improved and unique properties to solid media. In comparison to larger particles, the PNPs used in the present invention, can impart a variety of improved properties to solid media, for example, higher surface areas, higher porosity, controlled particle size, improved transparency, unique electronic properties, among others. As such, improved solid media containing PNPs are useful in a host of materials, including catalytic materials, sensors, separations media, and drug delivery materials.

By "separations medium" herein is meant a solid medium capable of effecting separation or purification in the form of, for example, a particulate polymeric material such as an ion exchange particle, a solid layer such as an ion exchange membrane, a permeable membrane, a separations fabric, a coated capillary separations tube, and an oxygen absorbing/scavenging material.

By "oxygen absorbing/scavenging material" is meant a material that absorbs or scavenges oxygen atoms, oxygen molecules, or ozone from the environment. The oxygen atoms, oxygen molecules, or ozone combines with the material through interactions characterized as chemical or physical.

By "catalytic material" herein is meant a material capable of promoting, enhancing, or enabling a chemical process or reaction. Catalytic materials include, but are not limited to, support materials containing a catalyst, e.g., a solid polymeric material modified by incorporation therein or thereon with a catalyst.

By "catalyst" herein is meant a catalytically active site, for example, a metal, capable of promoting, enhancing, or enabling a chemical process or reaction.

By "drug carrying material" herein is meant a material that can be loaded, or reacted, with a drug or other active agent to enhance the delivery of that drug or active agent.

By "sensor material" herein is meant a material that reacts, or interacts, with a substance or radiation, wherein the substance or radiation causes a change in the material that can be detected or measured.

By "combinatorial chemistry medium" herein is meant a material in the form of a solid substrate, layer, or coating, on which spatially discrete areas are designated for the preparation or modification of various chemical compounds or materials.

Unless indicated otherwise, the use of the term "or" herein is meant its inclusive form.

The improved solid media herein contain, include, are included within, or have physically or chemically associated with them, PNPs having a particle diameter of 1 to 50 nanometers, to provide at least one improvement in their desired function.

In a first aspect of the present invention, there is provided a separations medium, comprising: PNPs having a mean diameter in the range of from 1 to 50 nanometers, wherein said PNPs comprise as polymerized units at least one multi-ethylenically-unsaturated monomer.

In a second aspect of the present invention, there is provided a catalytic material, comprising: PNPs having a mean diameter in the range of from 1 to 50 nanometers, wherein said PNPs comprise as polymerized units at least one multi-ethylenically-unsaturated monomer.

In a third aspect of the present invention, there is provided a combinatorial chemistry medium, comprising: PNPs having a mean diameter in the range of from 1 to 50 nanometers, wherein said PNPs comprise as polymerized units at least one multi-ethylenically-unsaturated monomer.

In a fourth aspect of the present invention, there is provided a drug carrying material, comprising: PNPs having a mean diameter in the range of from 1 to 50 nanometers, wherein said PNPs comprise as polymerized units at least one multi-ethylenically-unsaturated monomer.

In a fifth aspect of the present invention, there is provided a sensor material, comprising: PNPs having a mean diameter in the range of from 1 to 50 nanometers, wherein said PNPs comprise as polymerized units at least one multi-ethylenically-unsaturated monomer.

In a sixth aspect of the present invention, there is provided a method for providing a solid medium, comprising:

forming PNPs having a mean diameter in the range of from 1 to 50 nanometers, said PNPs comprising as polymerized units a multi-ethylenically-unsaturated monomer; and forming said solid medium comprising said PNPs.

As used herein, the following abbreviations shall have the following meanings, unless the context clearly indicates otherwise: C=centigrade; $\mu$m=micron; UV=ultraviolet; rpm=revolutions per minute; nm=nanometer; J=joules; cc=cubic centimeter; g=gram; wt %=weight percent; L=liter; mL=milliliter; MIAK=methyl iso-amyl ketone; MIBK=methyl iso-butyl ketone; BA=butyl acrylate; AA=acrylic acid; MAA=methacrylic acid; PS=particle size= mean particle diameter; PMA=poly(methyl acrylate); CyHMA=cyclohexyl methacrylate; EG=ethyleneglycol; DPG=dipropyleneglycol; DEA=diethyleneglycol ethyl ether acetate; BzA=benzylacrylate; BzMA=benzyl methacrylate; MAPS=MATS=(trimethoxylsilyl)propyl methacrylate; OFPMA=octafluoropentyl methacrylate; propyl methacrylate; PETTA=pentaerythritol tetra/triacrylate; PPG400ODMA=polypropyleneglycol 4000 dimethacrylate; DPEPA=dipentaerythritol pentaacrylate; TMSMA= trimethylsilyl methacrylate; GMA=glycidyl methacrylate; MOPTSOMS=methacryloxypropylbis(trimethylsiloxy) methylsilane; MOPMDMOS=3-methacryloxypropylmethyldimethoxysilane; TAT=triallyl-1,3,5-triazine-2,4,6-(1H, 3H,5H)-trione; IBOMA=isobornyl methacrylate; PGMEA= propyleneglycol monomethylether acetate; PEGMEMA475=poly(ethyleneglycol methyl ether) methacrylate Mw=475; and PGDMA=propyleneglycol dimethacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

All ranges defined herein are inclusive and combinable.

The present invention is directed to solid media that contain PNPs having a mean particle diameter in the range of from 1 nm to 50 nm, the PNPs comprising as polymerized units a multi-ethylenically-unsaturated monomer.

Unless indicated otherwise, the PNPs used in the various embodiments of the present invention have a mean particle diameter typically in the range of from 1 nm to 50 nm, preferably from 1 to 40 nm, more preferably from 1 nm to 30 nm, even more preferably from 1 nm to 20 nm, even further preferably from 1 to 10 nm, and most preferably from 2 nm to 8 nm.

The PNPs are formed by the free radical polymerization of at least one multi-ethylenically-unsaturated monomer. Typically, the PNPs contain at least 1% by weight based on the weight of the PNPs, of at least one polymerized multi-ethylenically-unsaturated monomer. Up to and including 100% polymerized multi-ethylenically-unsaturated monomer, based on the weight of the PNPs, may be effectively used in the particles of the present invention. It is preferred that the amount of polymerized multi-ethylenically-unsaturated monomer is from 1% to 80% based on the weight of the PNPs, more preferably from 1% to 60% based on the weight of the PNPs, and even more preferably from 1% to 25% based on the weight of the PNPs. In certain embodiments, it is preferable that the amount of polymerized multi-ethylenically-unsaturated monomer is at least 5%, more preferably at least 10%, and even more preferably at least 15%, based on the weight of the PNPs.

Suitable multi-ethylenically-unsaturated monomers useful in the present invention include di-, tri-, tetra-, or higher multi-functional ethylenically unsaturated monomers such as, for example, trivinylbenzene, divinyltoluene, divinylpyridine, divinylnaphthalene and divinylxylene; and such as ethyleneglycol diacrylate, trimethylolpropane triacrylate, diethyleneglycol divinyl ether, trivinylcyclohexane, allyl methacrylate ("ALMA"), ethyleneglycol dimethacrylate ("EGDMA"), diethyleneglycol dimethacrylate ("DEGDMA"), propyleneglycol dimethacrylate, propyleneglycol diacrylate, trimethylolpropane trimethacrylate ("TMPTMA"), divinylbenzene ("DVB"), 2,2-dimethylpropane-1,3 diacrylate, 1,3-butyleneglycol diacrylate, 1,3-butyleneglycol dimethacrylate, 1,4-butanediol diacrylate, diethyleneglycol diacrylate, diethyleneglycol dimethacrylate, 1,6-hexanediol diacrylate, 1,6-hexanediol dimethacrylate, tripropyleneglycol diacrylate, triethyleneglycol dimethacrylate, tetraethyleneglycol diacrylate, polyethyleneglycol 200 diacrylate, tetraethyleneglycol dimethacrylate, polyethyleneglycol dimethacrylate, ethoxylated bisphenol A diacrylate, ethoxylated bisphenol A dimethacrylate, polyethyleneglycol 600 dimethacrylate, poly(butanediol) diacrylate, pentaerythritol triacrylate, trimethylolpropane triethoxy triacrylate, glycerylpropoxy triacrylate, pentaerythritol tetraacrylate, pentaerythritol tetramethacrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydrosiloxane), poly (phenyl vinyl siloxane) and mixtures thereof.

Suitable ethylenically-unsaturated monomers which may be incorporated as copolymerized units in the PNP include, but are not limited to: (meth)acrylic acid, (meth)acrylic anhydrides, maleic anhydrides, (meth)acrylamides, alkyl (meth)acrylates, vinyl acetates, alkenyl (meth)acrylates, aromatic (meth)acrylates, vinylaromatic monomers, functionalized vinylaromatic monomers, nitrogen-containing compounds and their thio-analogs, phosphorus-containing compounds such as phosphoethyl (meth)acrylate ("PEM"), maleate mono- and dialkyl esters, maleic acid, fumarates, maleamates and their copolymers with vinylaromatics, vinyl ethers, vinyl sulfides, and substituted ethylene monomers.

Typically, the alkyl (meth)acrylates useful in the present invention are ($C_1$–$C_{24}$) alkyl (meth)acrylates. Suitable alkyl (meth)acrylates include, but are not limited to, "low cut" alkyl (meth)acrylates, "mid cut" alkyl (meth)acrylates and "high cut" alkyl (meth)acrylates.

"Low cut" alkyl (meth)acrylates are typically those where the alkyl group contains from 1 to 6 carbon atoms. Suitable low cut alkyl (meth)acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl (meth)acrylates are typically those where the alkyl group contains from 7 to 15 carbon atoms. Suitable mid cut alkyl (meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and mixtures thereof. Useful mixtures include dodecyl-pentadecyl methacrylate ("DPMA"), a mixture of linear and branched isomers of dodecyl, tridecyl, tetradecyl and pentadecyl methacrylates; and lauryl-myristyl methacrylate ("LMA").

"High cut" alkyl (meth)acrylates are typically those where the alkyl group contains from 16 to 24 carbon atoms. Suitable high cut alkyl (meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Useful mixtures of high cut alkyl (meth) acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical (now Sasol) Company, i.e., ALFOL 1618 and ALFOL 1620, Ziegler catalyzed various NEODOL alcohols from Shell Chemical Company, i.e. NEODOL 25L, and naturally derived alcohols such as Proctor & Gamble's TA-1618 and CO-1270. Consequently, for the purposes of this invention, alkyl (meth)acrylate is intended to include not only the individual alkyl (meth)acrylate product named, but also to include mixtures of the alkyl (meth)acrylates with a predominant amount of the particular alkyl (meth)acrylate named.

The alkyl (meth)acrylate monomers useful in the present invention may be a single monomer or a mixture having different numbers of carbon atoms in the alkyl portion. Also, the (meth)acrylamide and alkyl (meth)acrylate monomers useful in the present invention may optionally be substituted. Suitable optionally substituted (meth)acrylamide and alkyl (meth)acrylate monomers include, but are not limited to: hydroxy ($C_2$–$C_6$)alkyl (meth)acrylates, dialkylamino ($C_2$–$C_6$)-alkyl (meth)acrylates, dialkylamino($C_2$–$C_6$)alkyl (meth)acrylamides.

Useful substituted alkyl (meth)acrylate monomers are those with one or more hydroxyl groups in the alkyl radical, especially those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl (meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxypropyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or "HPMA."

Other substituted (meth)acrylate and (meth)acrylamide monomers useful in the present invention are those with a glycidyl group, an amino group, dialkylamino group or dialkylaminoalkyl group in the alkyl radical. Examples of such substituted (meth)acrylates and (meth)acrylamides include, but are not limited to: glycidyl methacrylate, aminoethyl methacrylate, dimethylaminoethyl methacrylate, dimethylaminoethyl acrylate, N,N-dimethylaminoethyl methacrylamide, N,N-dimethyl-aminopropylmethacrylamide, N,N-dimethylaminobutylmethacrylamide, N,N-di-ethylaminoethyl methacrylamide, N,N-diethylaminopropyl methacrylamide, N,N-diethylaminobutyl methacrylamide, N-(1,1-dimethyl-3-oxobutyl)acrylamide, N-(1,3-diphenyl-1-ethyl-3-oxobutyl) acrylamide, N-(1-methyl-1-phenyl-3-oxobutyl) methacrylamide, and 2-hydroxyethylacrylamide, N-methacrylamide of aminoethylethyleneurea, N-methacryloxyethylmorpholine, N-maleimide of dim ethylaminopropylamine and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri ($C_1$–$C_6$)alkylsilyl (meth)acrylate, γ-propyl di($C_1$–$C_6$) alkoxy($C_1$–$C_6$)alkylsilyl (meth)acrylate, γ-propyl di($C_1$–$C_6$) alkyl($C_1$–$C_6$)alkoxysilyl (meth)acrylate, vinyl tri($C_1$–$C_6$) alkoxysilyl (meth)acrylate, vinyl di($C_1$–$C_6$)alkoxy($C_1$–$C_6$) alkylsilyl (meth)acrylate, vinyl ($C_1$–$C_6$)alkoxydi($C_1$–$C_6$) alkylsilyl (meth)acrylate, vinyl tri($C_1$–$C_6$)alkylsilyl (meth) acrylate, and mixtures thereof.

The vinylaromatic monomers useful as unsaturated monomers in the present invention include, but are not limited to: styrene ("STY"), α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$) alkylamino derivatives and the like.

The nitrogen-containing compounds and their thio-analogs useful as unsaturated monomers in the present invention include, but are not limited to: vinylpyridines such as 2-vinylpyridine or 4-vinylpyridine; lower alkyl ($C_1$–$C_8$) substituted N-vinylpyridines such as 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine; methyl-substituted quinolines and isoquinolines; N-vinylcaprolactam; N-vinylbutyrolactam; N-vinylpyrrolidone; vinylimidazole; N-vinylcarbazole; N-vinylsuccinimide; (meth)acrylonitrile; o-, m-, or p-aminostyrene; maleimide; N-vinyloxazolidone; N,N-dimethylaminoethylvinyl-ether; ethyl-2-cyanoacrylate; vinylacetonitrile; N-vinylphthalimide; N-vinyl-pyrrolidones such as N-vinylthiopyrrolidone, 3 methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 5,5-dimethyl-1-vinylpyrrolidone, 3,3,5-trimethyl-1-vinyl-pyrrolidone, 4-ethyl-1-vinylpyrrolidone, 5-methyl-5-ethyl-1-vinylpyrrolidone and 3,4,5-trimethyl-1-vinylpyrrolidone; vinyl pyrroles; vinyl anilines; vinyl versatates; and vinyl piperidines.

The substituted ethylene monomers useful as unsaturated monomers is in the present invention include, but are not limited to: allylic monomers, vinyl acetate, vinylformamide, vinyl chloride, vinylbenzyl chloride ("VBC"), vinyl fluoride, vinyl bromide, vinylidene chloride, vinylidene fluoride and vinylidene bromide.

The PNPs used in the present invention may be prepared by emulsion polymerization, suspension polymerization, non-aqueous dispersion polymerization, or solution polymerization. By "solution polymerization" herein is meant free radical addition polymerization in an aqueous or non-aqueous medium that is a solvent for the polymer of the PNP. By "solvent for the polymer" herein is meant that the polymer of the PNP absent crosslinking would be soluble in the polymerization medium, as may be predicted based on the solubility of a polymer made under the same conditions absent the crosslinking monomer for polymers containing less than about 20 wt. percent multi-ethylenically unsaturated monomer or by selection of a polymerization medium based on solubility maps as disclosed herein.

The PNPs may be prepared in a non-aqueous solvent. Examples of such solvents include, but are not limited to: hydrocarbons, such as alkanes, fluorinated hydrocarbons, and aromatic hydrocarbons, ethers, ketones, esters, alcohols and mixtures thereof. Particularly suitable solvents include dodecane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, diisobutylketone, propyleneglycol monomethyl ether, and alkyl alcohols, such as isopropanol, decanol, and t-butanol.

The PNPs may be prepared by first charging a solvent heel or, alternatively, a mixture of solvent and some portion of the monomer(s) to a reaction vessel equipped with a stirrer, a thermometer and a reflux condenser. The monomer charge is typically composed of monomer(s), initiator and chain transfer agent, as appropriate. The solvent or solvent/monomer heel charge is heated with stirring under a nitrogen blanket to a temperature from about 550° C. to about 125° C. After the heel charge has reached a temperature sufficient to initiate polymerization, the monomer charge or balance of the monomer charge is added to the reaction vessel over a period of 15 minutes to 4 hours while maintaining the reaction at the desired reaction temperature. After completing the monomer mixture addition, additional initiator in solvent may be charged to the reaction and/or hold periods may be employed.

The PNPs may be prepared by emulsion polymerization. The emulsion polymers useful in the present invention are generally prepared by first charging water and some portion of the monomer emulsion to a reaction vessel equipped with a stirrer, a thermometer and a reflux condenser. Typically, the monomer emulsion is composed of monomer, surfactant, initiator and chain transfer agent, as appropriate. The initial charge of monomer emulsion is added to a suitable reactor vessel that is heated with stirring under a nitrogen blanket to a temperature of from about 55° C. to about 125° C. After the seed charge has reached a temperature sufficient to initiate polymerization, the monomer emulsion or balance of the monomer emulsion is charged to the reaction vessel over a period of 15 minutes to 4 hours while maintaining the reaction at the desired reaction temperature. After completing the monomer emulsion addition, additional initiator may be charged to the reaction and/or hold periods may be employed.

In the alternative, the emulsion polymerization may be carried out in a batch process. In such a batch process, the emulsion polymers are prepared by charging water, monomer, surfactant, initiator and chain transfer agent, as appropriate, to a reaction vessel with stirring under a nitrogen blanket. The monomer emulsion is heated to a temperature of from about 55° C. to about 125° C. to carry out the polymerization. After completing the monomer emulsion addition, additional initiator in solvent may be charged to the reaction and/or hold periods may be employed.

Suitable PNPs include, for example: HEMA/DEGDMA, MMA/DEGDMA, MMA/MAPS/DEGDMA, MMA/MAPS/PETTA, MMA/MAPS/PPG4000DMA, MMA/MAPS/DPEPA, MAPS/DEGDMA, BA/DEGDMA, MMA/MAPS/TMPTMA, MMA/MAPS/DVB, STY/MAPS/DVB, BA/MAPS/DVB, BA/TMSMA/DVB, BA/MOPTSOMS/DVB, BA/MOPMDMOS/DVB, BA/MAPS/TAT, ALMA/BA/DVB, IBOMA/MAPS/DVB, IBOA/MAPS/DVB, BA/DVB, BA/PGDMA, BA/ALMA, BA/TMPTMA, BA/DPEPA, EHA/DVB, EHA/ALMA, EHA/TMPTMA, EHA/DPEPA, STY/DVB, STY/ALMA, EHA/STY/ALMA, MMA/BA/ALMA, STY/MMA/DVB, MMA/butadiene/STY, MMA/EA/ALMA, BA/ALMA/MATS, STY/MATS/DVB, MMA/BA/MATS, STY/MMA/MATS/DVB, MMA/GMA/ALMA, BA/GMA/TMPTA, MMA/BA/MATS/ALMA, BzA/TMPTMA, BzA/DVB, IDMA/BzMA and MMA/ALMA/MATS.

Control of particle size and distribution is achieved by such methods as choice of solvent, choice of initiator, total solids level, initiator level, type and amount of multifunctional monomer, type and amount of chain transfer agent, and reaction conditions. Particle sizes can be determined using standard dynamic light scattering techniques. Correlation functions can be converted to hydrodynamic sizes using LaPlace inversion methods, such as CONTIN.

Initiators useful in the free radical polymerization of the present invention include, for example, one or more of: peroxyesters, dialkyl peroxides, alkyl hydroperoxides, persulfates, azo initiators, redox initiators, and the like. Useful free radical initiators include, but are not limited to: benzoyl peroxide, t-butyl peroctoate, t-amyl peroxypivalate, cumene hydroperoxide, and azo compounds such as azoisobutylnitrile and 2,2'-azobis (2-methylbutanenitrile). It is preferred that the free radical initiator is t-amyl peroxypivalate. The amount of the free radical initiator used is typically from 0.05 to 10% by weight, based on the weight of total monomer.

Chain transfer reagents may optionally be used to prepare the PNPs useful in the present invention. Suitable chain transfer agents include, for example: alkyl mercaptans such as dodecyl mercaptan, and aromatic hydrocarbons with activated hydrogens such as toluene.

The PNPs typically have an apparent GPC weight average molecular weight in the range of 10,000 to 1,000,000, preferably in the range of 20,000 to 500,000 and more preferably in the range of 20,000 to 100,000. In the case of the PNP molecular weight, the molecular weight reflects the size of the PNP particles (through GPC elution time) as an indication of an apparent molecular weight measurement, and not necessarily as an absolute molecular weight measurement.

The PNPs may be prepared with ethylenically unsaturated monomers that contain at least one functionality ("functionalized monomers") that is not reacted during polymerization of the PNPs. Functionalized monomers are useful for attaching subsequent atomic or molecular groups to the PNPs, or for affecting the properties of the solid media in which they are incorporated. Various functionalized monomers are known in the art, see, e.g., "Polymer Handbook" (Fourth edition, J. Brandrup, E. H. Immergut, Editors, John Wiley & Sons). Examples of useful functionalities include hydroxy (e.g., HEMA), carboxylic acid (e.g., MAA), and glycidyl (e.g., GMA) functionalities.

The PNPs may also be post-polymerization functionalized. Many such functionalization techniques pertaining to polymeric materials are known in the art and can be used to prepare post-functionalized PNPs. Post-polymerization functionalization of the PNPs may be advantageous, such as in compatiblizing the particles with other ingredients in the media. Examples of post-functionalization include: sulfonation of styrene/DVB, and DVB PNPS; to lead to sulfonic acids; VBC may be further functionalized by displacement of chlorine, for example, by amino functionalities; VBC may be further functionalized with mercaptans. PNPs containing functional monomers can also be post-polymerization functionalized.

The PNPs are desirably discrete or unagglomerated and dispersible, miscible or otherwise compatible (preferably substantially compatible) with/in the media, and precursors thereto. The compatibility of the PNPs with the balance of the solid media composition is typically determined by a matching of their solubility parameters, such as the Van Krevelen parameters of delta d, delta p, delta h and delta v. See, for example, Van Krevelen et al., *Properties of Polymers. Their Estimation and Correlation with Chemical Structure*, Elsevier Scientific Publishing Co., 1976; Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, $2^{nd}$ Ed., CRC Press, 1991. Delta d is a measure of the dispersive interaction of the material, delta p is a measure of the polar interaction of the material, delta h is a hydrogen bonding parameter of the material and delta v is a measurement of both dispersive and polar interaction of the material. Such solubility parameters may either be calculated, such as by the group contribution method, or determined by measuring the cloud point of the material in a mixed solvent system consisting of a soluble solvent and an insoluble solvent. The solubility parameter at the cloud point is defined as the weighted percentage of the solvents. Typically, a number of cloud points are measured for the material and the central area defined by such cloud points is defined as the area of solubility parameters of the material.

In certain embodiments of the present invention, the solubility parameters of the PNPs and that of the solid media can be substantially similar. In this case, compatibility between the PNP and the solid media may be improved, and phase separation and/or aggregation of the PNP is less likely to occur.

The solid media of the present invention may be prepared using any of gaseous, liquid, or solid state reactants or components. When prepared in a liquid state, the liquid may be aqueous (e.g., substantially water), non-aqueous (e.g., substantially organic solvent), or mixed aqueous/non-aqueous (e.g., substantially water and water-soluble solvent).

The PNPs may be dispersed in a polymerization solvent used to prepare solid media, or they may be isolated by, for example, vacuum evaporation, by precipitation into a non-solvent, and spray drying; the isolated PNPs may be subsequently redispersed within or on a material appropriate for incorporation into a solid medium.

In one embodiment of the present invention, there is provided a separations medium formed from PNPs. In this embodiment, the PNPs can be processed as polymers using procedures known to the art for preparing separations media from polymers. Compositions of PNPs that are effective for forming into separations media can have compositions comparable to polymers that are used in the separations art. In this embodiment, the PNPs will preferably contain functionalities or polymerized units derived from functionalized monomers that are useful for affecting separation. Accordingly, the PNPs can be formed into a variety of separations media, including: ion exchange particles, ion exchange membranes, permeable membranes, mixed beds, thin films, carbonaceous resins, macroreticular resins, silica beads, separations fabrics, coatings for capillary separations tubes, and oxygen absorbing/scavenging materials.

In one embodiment of the present invention, there is provided a separations medium containing a solid medium that is modified with PNPs. In this embodiment, the solid medium can be formed from a variety of separations media, including: ion exchange particles, ion exchange membranes, permeable membranes, mixed beds, thin films, carbonaceous resins, macroreticular resins, silica beads, separations fabrics, coatings for capillary separations tubes, and oxygen absorbing/scavenging materials. The solid medium can be modified with PNPs in a variety of ways, such as, absorption, adsorption, mixing, blending, compounding, extruding, coating, combining, contacting, liquid deposition, vapor deposition, implantation, bombardment, aggregation, agglomeration, flocculation, precipitation, sintering, chemical linking, and combinations of the like.

In one embodiment of the present invention, there is provided a separations medium, including at least one solid medium in the form of a permeable membrane, which is capable of effecting separation or purification, and PNPs. In this embodiment, the permeable membrane can be ion permeable, and the PNPs contain at least one of anionic functionalities and cationic functionalities for affecting separation. Permeable membranes of the present invention can be made by following the methods provided in U.S. Pat. No. , 5,714,521, wherein the PNPs are incorporated into the solid medium.

In one embodiment of the present invention, thermally regenerable ion exchange resins ("TRRs") can be prepared. TRRs can be made by filling the voids in styrenic macroreticular copolymers with imbibed monomer mixture and then polymerizing the monomer mixture to provide crosslinked acrylic ester polymer in the pores, the product of which is a hybrid copolymer. The styrenic part of the hybrid copolymer can then be chloromethylated and converted to a weak base resin. Also, the acrylic ester can be hydrolyzed to its weak acid counterpart. This can provide a hybrid resin with separate domains of weak acid and weak base functionality which can bind to salts and which can be thermally regenerable. In this embodiment, weak base ("WB") or weak acid ("WA") PNPs (or a precursor thereof such as crosslinked acrylic ester particles) can be included in the monomer/crosslinker mixtures and polymerized to form the hybrid resins. While not being bound to a particular theory, the resulting hybrid resins can yield an improved hybrid WA/WB TRR that is superior to conventional TRRs because the PNPs provide better separation of the anionic and cationic sites. Methods for forming TRRs, which are provided in U.S. Pat. No. , 4,087,357, can incorporate WA and WB PNPs to prepare the TRRs of the present invention.

In one embodiment of the present invention, various ion exchange resins can be prepared from PNPs containing unsaturated carbon-carbon double bonds, e.g., DVB/VBC PNPs, by treating such PNPs with a suitable reactant. In this embodiment, weak base and strong base ion exchange resins can be made from PNPs containing unsaturated carbon-carbon double bonds, e.g., DVB/VBC PNPs, by treating such PNPs with a base, such as ammonia, and primary, secondary and tertiary amines, the last-mentioned to give strong base resins. Weak acid ion exchange resins can be prepared by treating PNPs containing unsaturated carbon-carbon double bonds, e.g., DVB/VBC PNPs, with an acid, such as thioglycollic acid. Polyphosphonate ion exchange resins can be prepared by treating PNPs containing unsaturated carbon-carbon double bonds, e.g., DVB/VBC PNPs, with phosphates. Sulfonic acid ion exchange resins can be prepared by treating PNPs containing unsaturated carbon-carbon double bonds, e.g., DVB/VBC PNPs, with bisulfites, e.g., sodium bisulfite. Polymercaptan ion exchange resins can be prepared by treating PNPs containing unsaturated carbon-carbon double bonds, e.g., DVB/VBC PNPs, with bisulfides, e.g., sodium bisulfide. Various ion exchange resins of the present invention can be made by following the methods provided in U.S. Pat. No. , 4,087,357, wherein the PNPs are incorporated into the solid medium.

In one embodiment of the present invention, PNPs can be incorporated into ion exchange resins and adsorbents to increase their physical stability. Resins and adsorbents made by suspension polymerization and functionalized by various means can yield products or intermediates that are physically unstable because of stresses caused by various swelling forces during processing.

In one embodiment of the present invention, the separations medium can be formed from PNPs. In this embodiment, PNPs can be incorporated into the solid media precursor materials during synthesis. For example, monomer mixtures used to synthesize solid media using polymerization techniques can contain PNPs to provide solid media (e.g., resins or adsorbents) wherein the PNPs are dispersed. Without being restricted to a particular theory, such PNP dispersions may improve physical stability of the solid media because the PNPs may impart porosity into ion exchange resins during polymerization-induced phase separation of the PNPs. Ion exchange resins with porosity typically have stronger physical stability, particularly to osmotic forces, compared to those lacking porosity; see U.S. Pat. Nos. 3,122,514, 4,221,871, 4,224,415, 4,256,840, 3,454,493, 4,501,826 and 6,323,249. In addition, incorporation of PNPs into ion exchange resins may provide a new type of "caged particle" porosity that is distinguished from traditional porous ion exchange resins. Porous ion exchange resins of the present invention can be made by using PNPs as the "porogen", which is disclosed in U.S. Pat. Nos. 3,122,514, 4,104,209, and 6,323,249.

In one embodiment of the present invention, PNPs can be incorporated into copolymer beads that can be transformed into high capacity porous ion exchange resins, such as macroreticular resins. Macroreticular resins prepared with phase extenders have interconnected pores and relatively high porosity when traditional porogens are used. This porosity reduces the overall volume capacity of resins made therefrom. By adding highly crosslinked PNPs of various compositions to various monomer mixtures at 5 to 20 wt % levels, one may obtain lower porosity "caged copolymers" of a ball in a spherical pore type which may be converted to strong high capacity resins superior to those known currently. High capacity porous ion exchange resins can be made according to the methods disclosed in U.S. Pat. No. , 6,323,249, by using the PNPs as the porogens therein.

In one embodiment of the present invention, PNPs can be incorporated into amphoteric resins for chromatography. By binding together with a suitable binding polymer, such as crosslinked PVA or crosslinked carboxy methylcellulose, two types of PNPs having acidic and basic character amphoteric resins can be provided. These PNPs are suitable as various bio-separation and other chromatographic separation solid media. These unique amphoteric resins can be made with a broad range of binders and a broad range of acidic and basic PNPs.

In one embodiment of the present invention, PNPs can be incorporated into mixed bed ion exchange resins to function as declumping agents. When acidic and basic ion exchange resins are used in mixed bed applications they frequently are difficult to separate by backwashing due to their tendency to clump together. Clumped resins regenerate poorly and water quality from the mixed bed suffers. By treating strong acid resins (SARs) with an appropriate dose of strong base resin (SBR) PNPs, and treating strong base resins with an appropriate dose of SAR PNPs, the PNPs may prevent clumping or improving declumping. While not being bound to a particular theory, the PNPs could serve as spacers to prevent clumping or improving declumping. The resulting mixed bed declumping agents are useful in ion exchange resins. Mixed bed ion exchange resins of the present invention can be made according to the procedures described in U.S. Pat. No. , 5,902,833, wherein the PNPs are incorporated as declumping agents. Ion exchange resins are useful for the production of ultra-pure water, which is used in the electronics and the power industry.

In one embodiment of the present invention, PNPs formed into ion exchange resins can be incorporated into water based highway paint to reduce drying time and to make water based paints more suitable for this application. Highway paints can be made according to the procedures in U.S. Pat. No. , 5,947,632, in which the ion exchange resins of the present invention are used.

In one embodiment of the present invention, PNPs can be incorporated into carbonaceous resins. Carbonaceous resins of the present invention can be made according to the procedures described in U.S. Pat. No. , 5,166,123, wherein the PNPs are used therein. Sulfonated porous PNPs and larger particles containing PNPs may be formed and pyrolized to carbonaceous resin particles. These carbonaceous resin particles, as well as the unpyrolyzed particles, can be used for high pressure chromatographic separations. Very high surface area materials can be formed in the carbonaceous case.

In one embodiment of the present invention, the PNPs can be incorporated into ion permeable membranes. Methods for forming permeable membranes are generally provided in U.S. Pat. No. , 4,766,161. Cation permeable membranes can be produced using functional PNPs possessing anionic functionality (e.g. sulfonate, carboxylate). Anion permeable membranes can be produced using functional PNPs possessing cationic functionality (e.g. substituted ammonium groups). The functional PNPs can be incorporated into a membrane by coating an inert material, mixing with an inert film forming material or by casting into a film. Bipolar membranes can be prepared by coating one side of a support with anionic particles of the present invention and the other side with cationic particles of the present invention.

In one embodiment of the present invention, PNPs can be incorporated into macroreticular resins. Macroreticular resins for ion exchange applications are typically prepared by suspension polymerization of monomers and crosslinkers in the presence of an appropriate solvent(s). It is contemplated that if PNPs were used as a porogen, e.g, crosslinked polyacrylic acid PNPs, macroreticular poly (STY/DVB) may be made by using polyacrylic acid seed, which can absorb a lot of water as the pH of the aqueous phase is changed from neutral to basic. In this case, water is part of the porogen and it is not necessary to remove the porogen after polymerization; this kind of ion exchange resin may be used for applications such as, for example, drug delivery, water treatment, catalytic materials, and chromatography solid media. Macroreticular resins can be made according to the procedures described in U.S. Pat. No. , 4,501,826, in which PNPs are incorporated as a porogen.

In one embodiment of the present invention, PNPs can be incorporated into uniform macropore silica beads. Preferably, STY/DVB PNPs may be used for making uniform silica beads with pore sizes in the range of 1 to 50 nm. Uniform macropore silica beads can be made according to the procedures described in U.S. Pat. No. 4,105,426, by incorporating these PNPs into the process.

In one embodiment of the present invention, PNPs can be incorporated into chromatography columns either as particles or functionalized particles as disclosed herein. The large surface area of the particles is expected to enhance the efficiency of separations.

In one embodiment of the present invention, PNPs can be incorporated into oxygen-absorbing/scavenging compositions such as, for example, metal loaded nanocomposites and polymercaptans. The polymercaptans may be formed by reacting residual unsaturation in the PNPs such as those including 50–100 wt % DVB with hydrogen sulfide. The oxygen-absorbing/scavenging particles may be used in adhesives or coatings such as those used in packaging applications. Without being bound to a particular theory, the oxygen adsorbing/scavenging compositions of the present invention may be superior to systems described in U.S. Pat. No. 6,296,678 B1 due to enhancements in surface area functionality afforded by the PNPs. Oxygen-absorbing/scavenging compositions of the present invention can be prepared according to procedures in U.S. Pat. No. 6,296,678 B1, wherein PNPs are used as a substrate. In this embodiment, oxygen-absorbing/scavenging compositions can be prepared by exposing PNPs to iron deposition in a fluidized state. Preferably, the iron-deposited PNPs stay well-dispersed (i.e., are not clumped or aggregated) after being deposited with iron. The pyrophoric product can be handled under inert atmosphere and manipulated as necessary to convert it into forms appropriate for use as an oxygen scavenger, as described in *Oxygen-absorbing resin compo-* sition for multilayer packaging materials, Jpn. Kokai Tokkyo Koho (2000), JP 2000212448 A2.

In one embodiment of the present invention, PNPs can be incorporated into oxygen-absorbing/scavenging compositions. In this embodiment, an ester of MAA with L-ascorbic acid can be used as one of the monomers in preparing the PNPs. For example, oxygen-absorbing/scavenging PNPs can be prepared using from 10 to 50 wt % of monomers containing an L-ascorbic acid moiety, such as an ester of MAA with L-ascorbic acid. Preparation of such monomers and their use in preparing oxygen-absorbing/scavenging compositions are described in *Manufacture of L-Ascorbic Acid Derivatives as Monomers for Oxygen-Reducing Polymers and Oxygen Scavengers*, Jpn. Kokai Tokkyo Koho (1997) JP 09316066 A2 19971209. The resulting PNPs can be used as oxygen scavengers alone or as components of more complex systems.

In one embodiment of the present invention, PNPs having a diameter of 1 to 80 nanometers can be incorporated into the outer layer of pellicular packings such as for ion chromatography columns. General methods for forming outer layers of pellicular packings are provided in U.S. Pat. No. 4,383,047. The preferred PNP mean diameter for this embodiment is in the range of from 5 to 50 nm. The PNPs preferably have a high base content (e.g., greater than 10 weight percent basic functionalities based on total PNP weight) to make anion exchange packings. Alternatively, cation exchange packings can be made with PNPs is high in acid content (e.g., greater than 10 weight percent acid functionalities based on total PNP weight). The higher surface area of the PNPs compared to current technology would allow for greater column capacity and thus improved chromatographic separations. Comparable PNPs could also be used to coat or functionalize the inner wall of fused silica capillary tubes, which can be used for open tubular liquid chromatography (OTLC) and capillary electrophoresis (CE).

In one embodiment of the present invention, the PNPs of the present invention are used to coat surfaces and objects to provide improved solid media in the form of a thin film of PNPs. Methods to produce such films include various coating processes known in the art, such as air, blade, knife, spray, roller, gravure, inkjet, casting, and spin coating.

In one embodiment of the present invention, PNPs are incorporated into a combinatorial chemistry substrate. These substrates typically are in the form of chemically modified particles that are suitable for the examination of various chemistries. In this embodiment, the combinatorial chemistry medium can be in the form of a solid substrate, layer, or coating, on which chemical compounds or materials are prepared or modified on spatially discrete areas. Combinatorial chemistry media and substrates of the present invention can be prepared by mixing, blending, co-reacting, or adsorbing PNPs with materials which are useful as, or used in preparing, "matrices" and "matrix materials" for combinatorial chemistry applications. Examples of suitable combinatorial chemistry media include any materials that are routinely used in chemical and biochemical synthesis. The media are typically polymeric materials that are compatible with chemical and biological syntheses and assays, and include, glasses, silicates, cellulosics, polystyrenes, polysaccharides, polypropylenes, sand, as well as a variety of synthetic resins and polymers, including acrylamides, particularly cross-linked polymers, cotton, and other such materials. In cases where the media are polymeric in nature, the substrate monomer(s) can be polymerized in the presence of the PNPs, e.g., the PNPs can be blended with the substrate monomers prior to polymerizing the substrate polymer. Various "matrices", "matrix materials", and methods for preparing combinatorial chemistry media are provided in U.S. Pat. No. 6,340,588 B1. In addition, the following references describe suitable compositions used for preparing solid supports: Merrifield, R. B. *J. Am. Chem. Soc.* 1963, 85, 2149; Wang, S.-S. *J. Org. Chem.* 1975, 40, 1235; Mitchell, A. R. et al., *Tetrahedron Lett.* 1976, 17, 3795; Bayer, E. *Angew. Chem., Int. Ed. Engl.* 1991, 30, 113; and Brit. UK Pat. Appl. (1999) GB 2338487 A1. Suitable derivatizations of the solid supports are also provided in PCT World Patent Application WO 0005243 A2.

In one embodiment of the present invention, the PNPs can be used as a sensor material. The specificity obtainable with the PNPs makes them useful in the detection of chemical vapors, gases, odors and biological molecules. For example, PNPs can be capable of adsorbing a vapor or gas, wherein the adsorbtion causes a change in the PNP (i.e., swelling). This change can be measured as a change in conductivity or capacitance and is enhanced by the hopping phenomena found in an array of PNPs. Similarly, a sensor particle can contain a receptor moiety. The response time and sensitivity of this type of PNP sensor or biosensor device can be improved over current sensors or biosensors. PNPs can be incorporated into the various procedures for preparing sensors and sensor materials. Various sensors and sensor materials of the present invention can be made according to the procedures described in U.S. Pat. No. 6,312,809, wherein the materials incorporate PNPs. For example, PNPs containing at least 10 wt % DPEPA can be linked to an aminoalkylmercaptan self-assembled monolayer via Michael-like addition carbon-nitrogen bond formation of the surface amine groups to pendant acrylate unsaturation groups to form a sensor material. Covalent linkages can be confirmed spectroscopically and by other physical methods, such as ellipsometry. Such coated surfaces can be useful in surface acoustic wave (SAW) devices as chemical sensors, such as described in Example 3 of U.S. Pat. No. 6,312,809.

In one embodiment of the present invention, PNPs can be incorporated into drug carriers. The PNPs of the present invention may be formulated with poorly soluble active materials, such as drugs, to increase their solubility and bioavailability in both peroral and parenteral administration. Without being bound to a particular mechanism, PNPs can be used in various drug applications, such as carriers, taste maskers, drug stabilizers, and drug activators, because the PNPs can be small enough to pass through membrane walls. Active PNPs can be used to target specific regions of the body to treat or prevent specific diseases. Since the PNPs are comparable in size to proteins, DNA, RNA and viruses, they may be more recognizable by the body and may allow for specific interactions with the body (i.e., PNPs may have pharmacological activity). Various methods of preparing drug carrying materials can incorporate PNPs for preparing the drug carriers of the present invention. In this embodiment, it is preferred that the drug carrying material is a solid polymeric material. Various methods of preparing polymers for drug delivery are provided in European Patent Application EP 1034839 A1, which discloses the use of dendritic polymers (dendrimers) for preparing drug delivery polymers. U.S. Pat. No. 5,714,166 A1 also provides numerous examples of compositions of dendrimers with drugs and other bioactive agents, from insulin to aspirin. In the present invention, drug delivery polymers can be prepared by replacing the dendritic polymers (dendrimers) of EP 1034839 A1 and U.S. Pat. No. 5,714,166 A1 with PNPs of comparable polymerized unit compositions and molecular weight. In this embodiment, the PNPs preferably contain amine functional groups, such as polymerized units of DMAEMA, to prepare amine-functional PNPs. These amine-functional PNP's can be combined with 2-(acetyloxy)benzoic acid in chloroform to give acid:tertiary amine ratios of about 1:1. Without being limited to a particular theory, the interior association of 2-(acetyloxy) benzoic acid in the PNP's can be demonstrated spectroscopically to confirm that amine-functional PNP's can function as carrier molecules. These amine-functional PNPs can be combined with a drugs, such as pseudoephedrine, insulin and other molecules as well, such as herbicides (e.g., 2,4-dichlorophenoxyacetic acid), imaging agents, and the like, to prepare controlled-release carrier systems.

In one embodiment of the present invention, PNPs can be incorporated into catalytic materials. In this embodiment, the PNPs can be formed into catalytic materials, or they can be used as substrates for attaching catalysts (i.e., carrier materials for catalysts). PNPs formed into catalytic materials contain catalytic sites, or contain catalytic precursors that can be subsequently formed into catalytic sites. These catalytic materials would have one advantage over known catalytic materials in that they would have improved dispersibility in various reaction media. PNPs can be effective and easily used in solution, slurry, dispersion, bulk, emulsion, solid, liquid or gas phase reactions. PNPs may not require isolation and handling as such, but they may be employed in the medium in which the reaction ingredients are produced. When the PNPs function as carrier materials for catalysts, the small amount of PNP carrier materials may optionally be left in the system as may the spent catalyst. For the production of these catalysts, one may form mixtures of PNP "solutions" with catalysts and use the mixture directly as the catalytic material. These mixtures may also be subsequently processed using various methods to alter the resulting form of the catalytic material. Such methods include, but are not limited to, absorption, adsorption, blending, compounding, extruding, coating, combining, contacting, liquid deposition, vapor deposition, implantation, bombardment, aggregation, agglomeration, flocculation, precipitation, sintering, chemical linking, and combinations of the like.

In one embodiment of the present invention, PNPs are incorporated into catalytic materials for olefin polymerizations. Methods for forming olefin polymerization catalysts are provided in U.S. Pat. No. , 6,100,214. Catalytic materials that contain PNPs have the advantage that the catalysts would disperse effectively in various polymerization media. These catalytic materials may be used in solution, slurry or gas phase polymerization systems. They may not require isolation and handling as such, but they may be employed in the medium in which the active agents are produced. When the PNPs function as a carrier for the catalysts, they afford the use of small amounts of carrier medium, which may optionally be left in the system. The spent catalyst may also optionally be left in the system. The most preferred particle sizes in this embodiment are 2–15 nm, which may provide improved clarity of the resulting polyolefins. For the production of these PNP catalytic materials, one may add solutions containing PNPs to the active catalyst composition and use the mixture directly as the polymerization catalyst. One may also prepare these catalytic materials by any of the various methods for combining PNPs and catalysts as described hereinabove.

In one embodiment of the present invention, PNPs can be incorporated into organometallic catalysts. Methods for forming organometallic catalysts are provided in U.S. Pat. Appl. No., 20020026013 A1. The organometallic catalysts of the present invention may contain ligands in the PNPs that are catalytically active. PNPs containing phosphine ligands that may be catalytically active can be prepared by addition of phosphines to residual double bonds present in the PNPs. Catalysts for olefin polymerizations can be prepared by combining polyunsaturated PNPs with organometallic olefin polymerization catalysts. Unlike prior art organometallic olefin polymerization catalysts that normally require activation (e.g., catalysts which are activated with methalumoxanes; adsorbants such as magnesium chloride; or with various ligand species), the organometallic olefin polymerization catalysts of the present invention do not require such activation.

Various types of catalysts can be combined with PNPs for preparing the catalytic material of the present invention. Several types of catalysts that can be combined with PNPs include Ziegler-Natta, single-site, and Brookfield catalysts. In this embodiment, the PNPs preferably contain residual unsaturation groups. Residual unsaturation groups can be provided in PNPs, for example, by using a sufficient amount of multi-ethylenically unsaturated monomer, e.g., DVB, to provide excess carbon-carbon double bonds. The amount of multi-ethylenically unsaturated monomer will typically be at least 5 wt %, preferably at least 10 wt %, more preferably at least 20 wt %, and most preferably at least 30 wt %, based on total monomers used to prepare the PNPs. Without being bound to a particular theory, the residual unsaturation may serve as ligand structures to anchor soluble/homogeneous catalysts. Accordingly, the catalysts of the present invention may work in the absence of alumoxane. Because alumoxane normally reduces the efficiency of catalysts, the PNPs of the present invention that do not require alumoxane may have increased efficiencies.

In one embodiment of the present invention, catalytic materials may be prepared with PNPs having sulfonic acid functionality. These catalytic materials may have improved surface area yet would share their ability to be azeotropically dried (as is not the case for p-toluenesulfonic acid based catalytic materials). The enhanced acidity of PNPs having sulfonic acid functionality may make them especially useful in anhydrous systems. This may also be the case for corresponding ring (and double bond) halogenated PNPs, which may have enhanced acidity or higher use temperatures. Other double bond addition reactions that provide useful structures in PNPs for both catalytic and noncatalytic applications include addition of hydrosilanes, addition of phosphites and addition of phosphonates, among others.

In one embodiment of the present invention, PNPs are incorporated into a monolith. Methods for forming monoliths are provided in U.S. Pat. No. , 5,540,981. Monoliths may be prepared by passing PNPs or functionalized PNPs through an extruder at such a temperature that sintering would occur. The resulting monoliths may be used as catalysts, for treating gasses, as catalyst supports and for other applications where monoliths are commonly applied.

The following examples are presented to illustrate further various aspects of the present invention.

EXAMPLE 1

Preparation of PNPs

A 500 mL reactor was fitted with a thermocouple, a temperature controller, a purge gas inlet, a water-cooled reflux condenser with purge gas outlet, a stirrer, and an addition funnel. To the addition funnel was charged 201.60 g of a monomer mixture consisting of 18.00 g methyl methacrylate (100% purity), 2.00 g diethyleneglycol dimethacrylate (100% purity), 1.60 g of a 75% solution of t-amyl peroxypivalate in mineral spirits (Luperox 554-M-75), and 180.00 g diisobutyl ketone ("DIBK"). The reactor, containing 180.00 g DIBK was then flushed with nitrogen for 30 minutes before applying heat to bring the contents of the reactor to 75° C. When the contents of the reactor reached 75° C., the monomer mixture in the addition funnel was uniformly charged to the reactor over 90 minutes. Thirty minutes after the end of the monomer mixture addition, the first of two chaser aliquots, spaced thirty minutes apart and consisting of 0.06 g of a 75% solution of t-amyl peroxypivalate in mineral spirits (Luperox 554-M-75) and 2.00 g DIBK, was added. At the end of the second chaser aliquot, the contents of the reactor were held 2 1/2 hours at 80° C. to complete the reaction. The resulting polymer was isolated by precipitation with heptane, collected by filtration and dried under vacuum to yield a white powder. This material was redissolved in propyleneglycol monomethyl ether acetate. The PNPs thus formed had a particle size distribution of from 0.8 to 5.0 nm with mean of 1.4 nm as determined by dynamic laser light scattering and a molecular weight of about 22,642 g/mol with a number average molecular weight of about 14,601 g/mol and Mw/Mn distribution of 1.6 as measured by GPC.

EXAMPLE 2

Preparation of PNP—AAEM/ALMA Copolymer by a Semi-batch Emulsion Polymerization Process A monomer emulsion was made from a mixture of 17 g deionized water, 8.85 g of 28% w/w solids ammonium lauryl sulfate ("ALS"), 12.4 g acetoacetoxyethyl methacrylate ("AAEM"), and 1.78 g allyl methacrylate ("ALMA"). A reaction kettle was then prepared with 600 g deionized water, 15.0 g of 28% w/w solids ALS, and 0.15 g ammonium persulfate ("APS") in 1 mL deionized water. The reaction kettle was heated to 90° C. while being purged with nitrogen. One half of the monomer emulsion was added to the reaction kettle with stirring at 200 rpm. After 20 minutes, the remaining monomer emulsion was added. The kettle temperature was kept at 90° C. for 30 minutes, cooled to 55° C., and then a solution of 0.02 g t-butyl hydroperoxide ("t-BHP") in 1 mL of deionized water and a solution of 0.010 g sodium sulfoxylate formaldehyde ("SSF") in 1 mL of deionized water were added respectively. The reaction was then cooled to ambient temperature and the emulsion was filtered through 400 and 100 mesh sieves respectively. The PNP was isolated from water by freeze-drying to produce a white friable, free flowing powder. The resulting white powder was washed with copious amounts of doubly distilled and deionized water to remove most of the surfactant.

EXAMPLE 3

Preparation of PNP—AAEM/ALMA Copolymer Prepared by a Batch Emulsion Polymerization Process A monomer emulsion was made from a mixture of 17 g deionized water, 8.85 g of 28% w/w solids ALS, 12.4 g AAEM, and 1.78 g ALMA in a bottle. A reaction kettle was then prepared with 600 g deionized water, 15.0 g of 28% w/w solids ALS, and 0.15 g APS in 1 mL deionized water. The reaction kettle was heated to 90° C. while being purged with nitrogen. The monomer emulsion was added all at once to the reaction kettle with stirring at 200 rpm. After 30 minutes, the temperature of the reaction flask was cooled to 75° C., and then a solution of 0.02 g t-BHP in 1 mL of deionized water was added. The reaction was cooled further to 55° C., and a solution of 0.010 g SSF in 2 mL of deionized water was added. The reaction was cooled to ambient temperature and the emulsion was filtered through 400 and 100 mesh sieves respectively.

EXAMPLE 4

Preparation of PNP by a Gradual-add Polymerization Process

A monomer emulsion was made from a mixture of 100 g water, 1.60 g of 28% w/w solids ALS, 68 g ethyl acrylate ("EA"), 17 g methyl methacrylate ("MMA"), 12.5 g divinylbenzene ("DVB"), and 5 g methacrylic acid ("MAA"). A reaction kettle containing 445 g water, 22.2 g of 28% w/w solids ALS and 0.37 g APS was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate (FeSO$_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve.

EXAMPLE 5

Preparation of Various PNPs

PNP compositions are reported in Table 5.1. These polymers were prepared according to the general procedures of Examples 1–4. The abbreviation "Mw" refers to the weight average molecular weight and the term "Mn" refers to the number average molecular weight. The term "Dist" refers to the ratio of Mw/Mn. The molecular weights were measured using a standard GPC method with tetrahydrofuran as the solvent.

TABLE 5.1

PNP compositions

| Sample 5- | Composition | Ratio | Mw | Mn | Dist |
|---|---|---|---|---|---|
| 1 | HEMA/DEGDMA | 90/10 | | | |
| 2 | MMA/DEGDMA | 90/10 | | | |
| 3 | MMA/DEGDMA | 90/10 | 19073 | 11183 | 1.7 |
| 4 | MMA/DEGDMA | 90/10 | 644 | 221 | 2.9 |
| 5 | MMA/DEGDMA | 90/10 | 771 | 3989 | 1.9 |
| 6 | MMA/MAPS/DEGDMA | 70/20/10 | 10640 | 4254 | 2.5 |
| 7 | MMA/MAPS/DEGDMA | 80/10/10 | 12819 | 8091 | 1.6 |
| 8 | MMA/MAPS/DEGDMA | 60/30/10 | | | |
| 9 | MMA/MAPS/DEGDMA | 40/50/10 | 43667 | 9047 | 4.8 |
| 10 | MMA/MAPS/DEGDMA | 20/70/10 | 166432 | 7404 | 22.5 |
| 11 | MAPS/DEGDMA | 90/10 | 11683 | 3484 | 3.4 |
| 12 | MMA/MAPS | 88.9/11.1 | 15965 | 7424 | 2.2 |
| 13 | BA/DEGDMA | 90/10 | 51007 | 29065 | 1.8 |
| 14 | MMA/MAPS/PETTA | 80/10/10 | | | |
| 15 | MMA/MAPS/ PPG4000DMA | 80/10/10 | | | |
| 16 | MMA/MAPS/DPEPA | 80/10/10 | | | |
| 17 | MMA/MAPS/TMPTMA | 80/10/10 | | | |
| 18 | MMA/MAPS/DEGDMA | 75/10/15 | | | |
| 19 | MMA/MAPS/DEGDMA | 85/10/5 | | | |
| 20 | MMA/MAPS/DVB | 10/60/30 | 95613 | 12003 | 8.0 |
| 21 | MMA/MAPS/DVB | 20/60/20 | 110422 | 19814 | 5.6 |
| 22 | MMA/MAPS/DVB | 25/60/15 | | | |

TABLE 5.1-continued

PNP compositions

| Sample 5- | Composition | Ratio | Mw | Mn | Dist |
|---|---|---|---|---|---|
| 23 | MMA/MAPS/DVB | 30/60/10 | | | |
| 24 | MMA/MAPS/DEGDMA | 20/70/10 | 35249 | 7438 | 4.7 |
| 25 | MMA/MAPS/DEGDMA | 30/60/10 | 35105 | 7003 | 5.3 |
| 26 | MMA/MAPS/DVB | 10/80/10 | 331732 | 29918 | 11.1 |
| 27 | STY/MAPS/DVB | 30/60/10 | 38455 | 12320 | 3.1 |
| 28 | BA/MAPS/DVB | 30/60/10 | 499094 | 36317 | 13.7 |
| 29 | BA/MAPS/DVB | 10/80/10 | 312848 | 16102 | 19.4 |
| 30 | BA/TMSMA/DVB | 10/80/10 | 674730 | 30989 | 21.8 |
| 31 | BA/MOPTSOMS/DVB | 10/80/10 | 97530 | 12154 | 8.0 |
| 32 | BA/MOPMDMOS/DVB | 10/80/10 | 363561 | 37553 | 9.7 |
| 33 | BA/MAPS/TAT | 10/80/10 | 12201 | 5182 | 2.4 |
| 34 | ALMA/BA/DVB | 10/80/10 | | | |
| 35 | IBOMA/MAPS/DVB | 10/80/10 | | | |
| 36 | BA/DVB | 90/10 | 223436 | 29309 | 7.6 |
| 37 | BA/PGDMA | 90/10 | 26797 | 8242 | 3.3 |
| 38 | BA/ALMA | 90/10 | 104529 | 15967 | 6.5 |
| 39 | BA/TMPTMA | 90/10 | 39638 | 16306 | 2.4 |
| 40 | BA/DPEPA | 90/10 | 103945 | 18702 | 5.6 |
| 41 | EHA/DVB | 90/10 | | | |
| 42 | EHA/ALMA | 90/10 | | | |
| 43 | EHA/TMPTMA | 90/10 | | | |
| 44 | EHA/DPEPA | 90/10 | | | |
| 45 | STY/DVB | 90/10 | | | |
| 46 | STY/ALMA | 90/10 | | | |
| 47 | EHA/STY/ALMA | 20/70/10 | | | |
| 48 | EHA/STY/ALMA | 45/45/10 | | | |
| 49 | MMA/DEGDMA | 90/10 | 22642 | 14601 | 1.6 |

EXAMPLE 6

Preparation of PNPs Useful for Solid Media

A one-liter reactor was equipped with a water condenser, thermocouple, overhead stirrer, nitrogen inlet and addition dip tube. 500 ml of xylene was charged to the reactor and the reactor heated to 80 C. A stir rate of 210 rpm was established and then a solution containing 8 grams of vinylbenzyl chloride, 15 grams of 55% purity divinylbenzene, 57 grams of styrene, 2 grams of 98% benzoyl peroxide and 120 grams of xylene was added at a rate of 1.5 ml/min. After addition was complete, the temperature was maintained at 80 C. for an additional 8 hours. The PNPs formed are suitable for further functionalization into materials useful as media for ion exchange, catalyst supports, sensors, separation media, and ion permeable membranes.

EXAMPLE 7

Preparation of PNPs Useful for Solid Media

A one liter reactor was equipped with a water condenser, thermocouple, overhead stirrer, nitrogen inlet and addition dip tube. 500 ml of xylene was charged to the reactor and the reactor heated to 80 C. A stir rate of 210 rpm was established and then a solution containing 40 grams of 80% purity divinylbenzene, 1 gram of 98% benzoyl peroxide and 120 grams of xylene was added at a rate of 1.5 ml/min. After addition was complete, the temperature was maintained at 80 C. for an additional 8 hours. The polydivinylbenzene particles formed were found be contain 0.4 mmol of residual vinyl group per gram and were suitable for further functionalization into materials useful as solid media for ion exchange, catalyst supports, sensors, separation media, and ion permeable membranes.

EXAMPLE 8

Outer Layer of Pellicular Packings

The outer layer of pellicular packings according to U.S. Pat. No. 4,383,047, is prepared using PNPs having an average diameter of 5–30 nm, and a composition of vinylbenzyl chloride (90%) divinylbenzene (10%) copolymer. The resulting material is useful as an outer layer for pellicular packings.

EXAMPLE 9

Oxygen Absorbing/Scavenging Material

Into a vertical glass tube 35 cm long by 1.5 cm diameter with valves at each end and containing a 100 mg sample of fluidized PNP of styrene-divinylbenzene with the composition of entry 45 in Table 5 held at 100° C. with an external heater and through which is passed a 4.7% hydrogen in argon gas stream saturated with iron pentacarbonyl obtained by bubbling the gas mixture through a saturator before entering the tube. The gas stream is added at 5 ml/min rate for 180 minutes during which time the weight of the sample is increased 100%. At 100° C. the iron carbonyl vapor decomposes in large measure to iron(0) which is deposited on the PNP. The pyrophoric product is handled under inert atmosphere for all subsequent transfers and manipulations necessary to convert it into forms appropriate for use as an oxygen scavenger, such as are mentioned in Jpn. Kokai Tokkyo Koho (2000), JP 2000212448 A2.

EXAMPLE 10

Permeable Membrane

The permeable membrane according to U.S. Pat. No. 4,766,161, Example No. 1, is prepared, with the exception that a solution containing PNPs having a mean diameter of 25 nm and a composition of divinylbenzene/vinylbenzyl chloride copolymer are used instead of the styrene/vinylbenzyl chloride copolymer of Example 1 in forming the membrane. The resulting material is useful as a permeable membrane.

EXAMPLE 11

TRR

The TRR according to U.S. Pat. No. 4,087,357, Process No. I and subsequent examples, is prepared, with the exception that 94.5 g of PNPs having a mean diameter of about 1 nm and a composition of 3% DVB crosslinked methyl acrylate are used during the step of loading the macroreticular copolymer and post polymerization of the PNP component. The resulting material is useful as a TRR after appropriate conversion of the hybrid copolymer into a TRR having both weak base and weak acid functionality as described in U.S. Pat. No. 4,087,357, Process No. 1, and the procedures that follow.

EXAMPLE 12

High Capacity Porous Resin

A high capacity and strong physical stability porous ion exchange resin is synthesized by the following procedure: Organic monomer phase containing Styrene (300 g), Divinylbenzene (24 g, 55% concentration), Benzoyl peroxide (4.3 g, 75%) and PNPs (60 g) with a composition: MMA MAPS/DVB (25:60:15) and mean diameter of 5 to 10 nm are charged into a flask containing about 500 ml aqueous phase containing surfactant. Agitation is applied so that the organic phase is dispersed in the form of fine droplets. The mixture is then heated to 79–82° C. over 1 hr. and then held for about 10 hrs. The copolymer beads are filtered and washed with water. After the copolymer beads are dried in the oven at 50 C. for 5 hrs, they can be chloromethylated and aminated or sulfonated to make anion or cation ionic exchange resins, respectively, with high capacity.

EXAMPLE 13

Combinatorial Chemistry Medium

The combinatorial chemistry medium according to GB 2338487 A1, Example No. 4, is prepared, with the exception that PNPs having a mean diameter of 50 nm, prepared from 4-chloromethylstyrene 60.8%, styrene 37.8%, and divinylbenzene (DVB) 1.4%, are added to the monomer mixture. The PNP weight fraction was 5 wt % based on total monomers used. The resulting polymeric bead material has improved particle size control arising from the PNP "seed" particles". The resulting material is useful as a combinatorial chemistry medium.

EXAMPLE 14

Combinatorial Chemistry Medium

The combinatorial chemistry medium according to GB 2338487 A1, Example No. 4, is prepared, with the exception that PNPs having a mean diameter of 50 nm, prepared from 4-chloromethylstyrene 60.8%, styrene 37.8%, and divinylbenzene (DVB) 1.4%, are adsorbed onto the polymeric material (bead substrates) from solution prior to drying the polymeric material to constant weight. The PNP weight fraction is 2 wt % based on total polymeric material. The resulting polymeric bead material has improved chemical attachment arising from the PNP "coating" particles.

EXAMPLE 15

Sensor Materials

The sensor materials according to U.S. Pat. No. 6,312,809 B1, Example No. 1, is prepared, with the exception that PNP's of the types of entries 40 or 44 in Table 5 are linked to an aminoalkylmercaptan self-assembled monolayer via Michael-like addition carbon-nitrogen bond formation of the surface amine groups to pendant acrylate unsaturations. Surfaces coated with the PNP-linked aminoalkylmercaptan self-assembled monolayer are used in surface acoustic wave (SAW) devices as chemical sensors, such as are described in Example 3 of U.S. Pat. No. 6,312,809 B1.

EXAMPLE 16

Drug Carrier—Retinal Nanocapsules

The retinal nanocapsule drug carrier according to EP 1034839 A1, Example 1, is prepared, with the exception that the PNP of the type of entry 1 in Table 5.1 is substituted for the commercial dendrimer product BOLTHORN H40™ from Perstorp.

EXAMPLE 17

Drug Carriers—Salicylic Acid

A PNP of the type of entry 40 or 44 from Table 5 is reacted with dimethylamine to carry out Michael-like addition reactions of the amine across the pendant acrylate double bonds, converting them into beta-aminopropionate groups. These PNPs are substituted for the dendrimers in example 1 of U.S. Pat. No. 5,714,166 to prepare controlled release associates of salicylic acid.

EXAMPLE 18

Drug Carriers—Insulin

A PNP of the type of entry 1 in Table 5, with the exception that 10–75% of the MMA is substituted by DMAEMA, is used to prepare amine-functional PNPs. These PNP's are combined with 2-(acetyloxy)benzoic acid in chloroform to give acid:tertiary amine ratios of 1:1. The interior association of 2-(acetyloxy)benzoic acid in the PNP's is demonstrated spectroscopically to confirm that these amine-functional PNP's can be used as drug carriers. The controlled release characteristics of such PNPs are demonstrated using dynamic dialysis as well as other physical methods. These amine-functional PNPs are combined with insulin to prepare a controlled-release drug carrier system.

EXAMPLE 19

Catalytic Material for Olefin Polymerization

The catalytic material for olefin polymerization according to U.S. Pat. No. 6,100,214 A1 is prepared, with the exception that PNPs having a mean diameter of 3 nm and a composition of divinylbenzene/vinylbenzyl chloride copolymer are used instead of chloromethylated polystyrene-co-divinylbenzene beads in the synthesis of the catalyst support. Olefin polymers are prepared using the catalytic material that is provided herein.

EXAMPLE 20

Organometallic Catalyst

The organometallic catalyst according to U.S. Pat. Appl. No. 2002, 0026013A1, Example No. 3, is prepared, with the exception that 0.5 grams of PNPs having a mean diameter of 25 nm and a composition of polydivinylbenzene are combined with the active catalyst. The resulting material is useful as an organometallic catalyst.

What is claimed is:

1. A separations medium, comprising: PNPs having a mean diameter in the range of from 2 to 9 nanometers, wherein said PNPs comprise as polymerized units at least one multi-ethylenically-unsaturated monomer.

2. The separations medium according to claim 1, wherein: the separations medium is formed from the PNPs, the separations medium comprising at least one of the following forms: an ion exchange particle, an ion exchange membrane, a permeable membrane, a mixed bed, a thin film, a carbonaceous resin, a macroreticular resin, a silica bead, a separations fabric, a coating for capillary separations tubes, and an oxygen absorbing/scavenging material.

3. The separations medium according to claim 1, wherein: the separations medium is formed from a least one solid medium, and said solid medium is modified with the PNPs.

4. A method for providing a solid medium, comprising:
   forming PNPs having a mean diameter in the range of from 2 to 9 nanometers, said PNPs comprising as polymerized units a multi-ethylenically-unsaturared monomer; and
   forming said solid medium comprising said PNPs.

5. The method according to claim 4, wherein said solid medium is selected from the group consisting of: an ion exchange particle, an ion exchange membrane, a permeable membrane, a separations fabric, a coated capillary separations cube, a mixed bed, a thin film, a carbonaeeous resin, a macroreticular resin, a silica bead, an oxygen absorbing/scavenging material, a catalytic material, a combinatorial chemistry medium, a drug carrying material, and a sensor material.

* * * * *